3,185,030
SYMMETRICAL PROJECTION OBJECTIVE

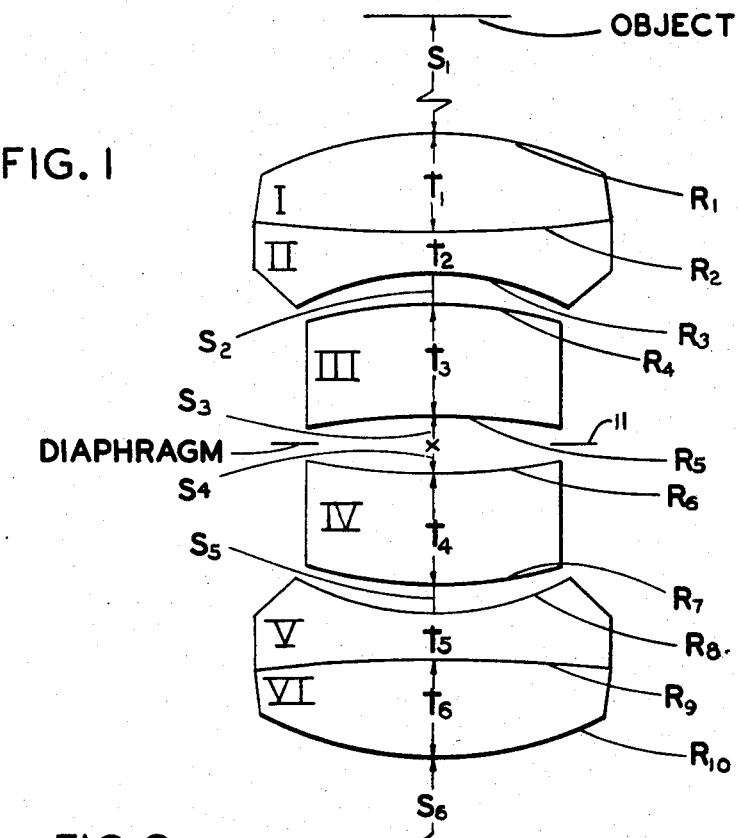

Nathan Rickless, Brighton, and Paul L. Ruben, Rochester, N.Y., assignors to Bausch & Lomb Incorporated, Rochester, N.Y., a corporation of New York
Filed Aug. 22, 1962, Ser. No. 218,691
1 Claim. (Cl. 88—57)

This invention relates to a symmetrical type of projection objective which is intended for use in copying or process work, and more particularly it relates to improvements therein.

It is an object of this invention to provide a novel projection objective having a relative aperture of substantially $f/16.0$ which is simple in form and construction and is characterized by high grade performance, the chromatic and monochromatic image aberrations as well as the astigmatism, coma, flatness of field and distortion being particularly of a high grade for use in copying or process work.

It is a further object to provide such a device in which a minimum number of optical parts are used and wherein the lens elements themselves are formed of comparative flat curvatures, all of which results in the production of a lens system of least cost and service requirement.

Further objects and advantages of this invention will be apparent in the details of construction described in the specification herebelow taken in connection with the accompanying drawing wherein, FIG. 1 is an optical diagram of a lens system or projection objective constructed according to the objects of the invention, FIG. 2 is a chart of the preferred values of constructional data used in constructing said objective, and FIG. 3 is a further chart giving the values of the conjugates at which said objective operates.

The objective is designated generally by the numeral 10 in FIG. 1 of the drawing, said objective being composed of a pair of compound meniscus negative lens members which are designated I, II and V, VI respectively. The aforesaid compound lenses are spaced apart from each other in mutual optical alignment and each compound lens has a concave refractive surface as described subsequently which face each other. Further comprised in said objective 10 is a pair of singlet thick meniscus positive lens members which are designated III and IV respectively, said lens members being optically aligned with and spaced between the aforesaid compound lens members and from each other. Said singlet lens members furthermore are spaced away from an interposed diaphragm 11.

Each of the compound lens members I, II and V, VI consists of an outer double convex positive lens I and VI respectively, said positive lens elements being in contact with inner double concave lens elements II, V respectively. The interfaces thereof are designated $R_2$ and $R_9$ and are convex toward the interposed diaphragm 11.

In order to achieve the stated objects of this invention, the specification for the focal lengths which are designated $F_I$ to $F_{VI}$ numbering from the entrant side of the optical system should be according to the table of mathematical statements given herebelow, $$\begin{matrix} F_I = F_{VI} = .297F \\ -F_{II} = -F_V = -.248F \\ F_{III} = F_{IV} = .673F \end{matrix} \bigg\} -14.63F$$

As noted above, the compound lens members have net negative power of $-14.63F$.

A preferred form of this invention is described in the table of constructional data given herebelow, the respective values given therein being specified in terms of the equivalent focal length F of the objective, $$\begin{array}{ll} R_1 = .240F & -R_{10} = .240F \\ -R_2 = .710F & +R_9 = .710F \\ R_3 = .178F & -R_8 = .178F \\ R_4 = .283F & -R_7 = .283F \\ R_5 = .440F & -R_6 = .440F \end{array}$$

(Absolute radius values)
$$t_1 = t_6 = .0605F$$
$$t_2 = t_5 = .0293F$$
$$t_3 = t_4 = .0759F$$

| Spaces | Magnification | | |
|---|---|---|---|
| | .5 to 1.0 | 1.0 to 1.0 | 1.0 to 1.5 |
| Object distance $S_1$ | 873.6 | 562.7 | 459.1 |
| Image distance $S_6$ | 407.2 | 562.7 | 718.1 |

| | |
|---|---|
| $S_2 = S_5$ | .0138F |
| $S_3 = S_4$ | .0193F | wherein $R_1$ to $R_{10}$ designate the successive refractive surfaces of the lenses and wherein the minus sign designates lens surfaces which are concave toward entrant rays, $t_1$ to $t_6$ designate the successive thicknesses of the lens elements, and $S_2$ to $S_5$ designate the interlens airspaces between the successive lens members respectively. $S_1$ and $S_6$ designate the object distance and image distance which are associated with this form of the invention.

Further with regard to the constructional data of the objective 10 the refractive index $n_D$ and the Abbe number $\nu$ should be as specified in the mathematical table herebelow.

Elements I and VI:
  $n_D = 1.605$ to $1.617$
  $\nu = 55.0$ to $65.0$
Elements II and V:
  $n_D = 1.555$ to $1.564$
  $\nu = 40.0$ to $50.0$
Elements III and IV:
  $n_D = 1.562$ to $1.569$
  $\nu = 48.0$ to $58.0$ The objective 10 has been particularly designed for the transmission of radiant energy having a wavelength range from 440 mu to 580 mu, this effect being achieved by coating the air glass surfaces $R_1$, $R_3$, $R_4$, $R_5$, $R_6$, $R_7$, $R_8$, and $R_9$ with anti-reflective coating of the specified transmission characteristics.

As indicated in FIG. 3 of the drawing the objective 10 is designed to work at or in the vicinity of unity magnification and the object space $S_1$ as well as the image space $S_6$ are given in the table herebelow for magnifications within range of .5:1.0 through 1.0:1.5.

| Conjugate spaces | Magnification | | |
|---|---|---|---|
| | .5 : 1.0 | 1 : 1 | 1 : 1.5 |
| $S_1$ | 873.6 | 562.7 | 459.1 |
| $S_6$ | 407.2 | 562.7 | 718.1 |

Stated in another manner the constructional data for the objective 10 is given in the chart of values herebelow wherein $R_1$ to $R_{10}$ designates the successive radii of the lens surfaces, $t_1$ to $t_6$ designates the successive lens thicknesses, $S_1$ to $S_6$ designates the successive airspaces surrounding the lens parts and $n_D$ and $\nu$ designate the respective refractive index and Abbe number of the successive lens elements I to VI. The minus signs related to the focal lengths mean negative power, and the minus signs which are related to the radius values $R_1$ to $R_{10}$ meaning that these surfaces are concave toward the entrant light rays.

[E.F.L.=310.9 mm.    $f/16.0$]

| Lens | Focal length | Radii | Spaces | Thicknesses | $n_D$ | $\nu$ |
|---|---|---|---|---|---|---|
| I | 92.28 | $R_1 = 74.473$ | | $t_1=18.8$ | 1.611 | 57.2 |
| | | $-R_2 = 220.8$ | | | | |
| II | -77.23 | $R_3 = 55.463$ | | $t_2=9.1$ | 1.559 | 45.5 |
| | | $R_4 = 87.902$ | $S_2=4.3$ | | | |
| III | 209.20 | $R_5 = 136.77$ | | $t_3=23.6$ | 1.566 | 53.8 |
| | | | $S_3=6.0$ | | | |
| | | | $S_4=6.0$ | | | |
| IV | 209.20 | $-R_6 = 136.77$ | | $t_4=23.6$ | 1.566 | 53.8 |
| | | $-R_7 = 87.902$ | $S_5=4.3$ | | | |
| | | $-R_8 = 55.463$ | | | | |
| V | -77.23 | $R_9 = 220.8$ | | $t_5=9.1$ | 1.559 | 45.5 |
| VI | 92.28 | $-R_{10} = 74.473$ | | $t_6=18.8$ | 1.611 | 57.2 |

The minus sign designates lens surfaces which are concave toward entrant light, and the air-glass surfaces of the objective having an anti-reflection film formed thereon which passes light of a range of wavelengths from 440 mu to 580 mu.

Although only a single form of this invention has been shown and described in detail, it will be understood that the form and arrangement of the parts of the objective and the optical data related thereto may be varied within reasonable limits and other values and arrangements may be utilized without departing from the spirit of the invention as defined in the claim here appended.

We claim:

A symmetrical type of projection objective for process work using light in the range $\lambda = 440$ to 580 mu, said objective comprising a pair of negative compound lens members of meniscus form which are concave toward each other, and a pair of positive singlet lens members of thick meniscus form which are spaced between the compound members and have adjacent concave surfaces between which a diaphragm is interposed, the values for the radii $R_1$ to $R_{10}$ of the successive lens surfaces, the lens thicknesses $t_1$ to $t_6$, the successive interlens airspaces $S_2$ to $S_5$, the respective refractive indices $n_D$ and Abbe number $\nu$, the focal lengths of the respective lens elements I to VI being designated $F_I$ to $F_{VI}$ being given in the chart herebelow,

[E.F.L.=310.9 mm.    $f/16.0$]

| Lens | Focal length | Radii | Spaces | Thicknesses | $n_D$ | $\nu$ |
|---|---|---|---|---|---|---|
| I | 92.28 | $R_1 = 74.473$ | | $t_1=18.8$ | 1.611 | 57.2 |
| | | $-R_2 = 220.8$ | | | | |
| II | -77.23 | $R_3 = 55.463$ | | $t_2=9.1$ | 1.559 | 45.5 |
| | | $R_4 = 87.902$ | $S_2=4.3$ | | | |
| III | 209.20 | $R_5 = 136.77$ | | $t_3=23.6$ | 1.566 | 53.8 |
| | | | $S_3=6.0$ | | | |
| | | | $S_4=6.0$ | | | |
| IV | 209.20 | $-R_6 = 136.77$ | | $t_4=23.6$ | 1.566 | 53.8 |
| | | $-R_7 = 87.902$ | $S_5=4.3$ | | | |
| | | $-R_8 = 55.463$ | | | | |
| V | -77.23 | $R_9 = 220.8$ | | $t_5=4.3$ | 1.559 | 45.5 |
| VI | 92.28 | $-R_{10} = 74.473$ | | $t_6=18.8$ | 1.611 | 57.2 |

The minus sign designates lens surfaces which are concave toward entrant light, and the air-glass surfaces of the objective having an anti-reflection film formed thereon which passes light of a range of wavelengths from 440 mu to 580 mu.

References Cited by the Examiner

UNITED STATES PATENTS 1,792,917    2/31    Merte _____ 88—57
2,635,505    4/53    Schade _____ 88—57

FOREIGN PATENTS 547,739    9/42    Great Britain.

JEWELL H. PEDERSEN, *Primary Examiner*.